United States Patent [19]
Regner et al.

[11] 3,907,003
[45] Sept. 23, 1975

[54] SHIRRED SAUSAGE CASINGS AND METHOD AND APPARATUS FOR MAKING SAME

[75] Inventors: Richard Regner; Gerd Schug, both of Mainz-Bretzenheim, Germany

[73] Assignee: Kalle Aktiengesellschaft, Wiesbaden-Biebrich, Germany

[22] Filed: July 24, 1973

[21] Appl. No.: 382,159

Related U.S. Application Data

[63] Continuation-in-part of Ser. No. 290,816, Sept. 21, 1972.

[30] Foreign Application Priority Data
July 26, 1972 Germany............................ 2236600

[52] U.S. Cl. .................. 138/118.1; 17/42; 426/135
[51] Int. Cl.² ........................................ A22C 13/02
[58] Field of Search................ 138/118, 118.1, 122; 17/42; 426/135

[56] References Cited
UNITED STATES PATENTS

| | | | |
|---|---|---|---|
| 3,362,434 | 1/1968 | Medford et al...................... | 138/122 |
| 3,397,069 | 8/1968 | Urbutis et al..................... | 138/118.1 |
| 3,454,981 | 7/1969 | Martinek ................................ | 17/42 |
| 3,454,982 | 7/1969 | Arnold.................................... | 17/42 |
| 3,461,484 | 8/1969 | Arnold.................................... | 17/42 X |
| 3,704,483 | 12/1972 | Urbutis et al........................ | 17/42 X |

Primary Examiner—John W. Huckert
Assistant Examiner—Charles Gorenstein
Attorney, Agent, or Firm—Stevens, Davis, Miller & Mosher

[57] ABSTRACT

A shirred casing forming a hollow cylinder and displaying an outwardly projecting helical main fold and further displaying in an extended and flattened state, secondary lines lying between the windings of the helical line of the main fold in which the lines of the secondary fold consist of a continuous, uninterrupted, uniform zigzag line which is substantially without further secondary folds, that the peaks of this zigzag line have a substantially constant distance from the helical line of the main fold and that the individual sections of this zigzag line are helical sections which wind in the opposite sense to the helical main fold. A method for shirring sausage casings in which in the method the casing is moved in a direction of its longitudinal axis and while so moving has a force applied to shirr the casing which moves about the longitudinal axis of the casing. An apparatus which includes rollers for forwarding a collapsed casing, an annular element adapted to rotate about the longitudinal axis of the casing to shirr the casing and a backing element adapted to hold the forward end of the casing in a fluid-tight manner and having a passage through which an inflating gas may pass to inflate the casing.

4 Claims, 23 Drawing Figures

SHIRRED SAUSAGE CASINGS AND METHOD AND APPARATUS FOR MAKING SAME

This application is a continuation-in-part application of U.S. Ser. No. 290,816, filed Sept. 21, 1972.

The present invention relates to a stick, i.e., a casing, more particularly a sausage casing of circular-cylindrical shape that has been shirred to form a hollow cylinder and to a method and apparatus for shirring the cylindrical casings.

Sticks of this type have been known for a long time. Formerly, such sticks showed a very crude fold pattern. In some of them the folds were distributed in an irregular, random fashion. More recently, efforts made to produce sticks of more attractive appearance, improved resistance to bending, and a treater shirring ratio resulted in a more regular fold formation. Today, sticks are available on the market which have an outwardly extending helical main fold, and secondary folds arranged between the windings of the main fold and the interior space of the hollow cylinder. The section of casing between the interior space and the main fold is substantially superposed in helical layers whose profile is substantially of the shape of a circular frustum. "Of the shape of a circular frustum" shall mean that a section lying in a plane containing the axis of the hollow cylinder is rotated around the axis of said hollow cylinder, said section being approximated by a straight line which forms an angle substantially different from 90° or 0° with the axis of the hollow cylinder.

Modern sticks having a helical main fold are relatively acceptable in appearance and possess a certain resistance to bending after they have been compressed further. The secondary folds between the windings of the main fold and the interior space of the hollow cylinder, however, are irregular, random creases in such sticks. This type of fold makes it necessary to use a mandrel during the production of the stick, which supports the secondary folds and thus prevents the irregular fold formation from barring the desired interior space. As a result, the stick adheres very firmly to the mandrel, which causes problems of machinery and involves the risk of damaging the stick of shirred casing.

To enable a casing to be handled in a more rational manner when being filled, particularly with sausage meat, there is now an increasing need for casings that are shirred in the longitudinal direction. These shirred casings are required to possess properties in which the ratio of the length of the unshirred casing to that of the shirred casing (shirring ratio) is as great as possible and the shirred stick possesses high resistance to bending, is exactly straight, has the greatest possible inside diameter and runs off the stuffing horn easily and regularly. Furthermore, there can be no unsound areas in the casing.

The shirring of sausage casings has hitherto always been carried out by methods which in principle were based on a mechanizing of the shirring by hand. The shirring elements have therefore also always been moved in the direction of the longitudinal axis of the sausage casing. These known shirring methods have continued to be further refined with varying degrees of success and with varyingly increased complication of the technical means.

First, efforts were made to shirr sausage casings by holding portions of them by means of crimping fingers and pressing them against a backing means. Later, it was proposed to cause the crimping fingers to engage the sausage casing in such a way that the crimping force was not applied simultaneously to opposite parts of the casing. In this method the sausage casing was collapsed in the axial direction by means of crimping fingers positioned alternately at opposite sides of the casing. This resulted in a certain improvement since to some extent the folds in the sausage casing were hooked to one another. The shirring ratio was rather poor, however. The last-mentioned method is described in German Pat. No. 1,072,500. This patent also discloses the idea of applying the crimping force by crimping fingers each of which is moved in the direction of the axis of the sausage casing for effecting the crimping action, the fingers however being disposed one behind the other along a helical line on the sausage casing.

In order to shirr a sausage casing in such a manner in which a substantially helical main fold is formed, it has also been proposed to carry out the shirring process with the aid of grooved shirring rollers which are caused to execute a slight eccentric movement. Two, three and four such eccentrically rotating shirring rollers were tried out with success (see German Pat. No. 1,192,072). For the purpose of obtaining a shirred stick having helical main fold, it has also been proposed to operate with three crimping-finger wheels, the grooves in the teeth on each wheel being disposed in succession in a central position, in a position to the left thereof, and in a position to the right thereof: (see German Pat. No. 1,235,766).

Finally, it has been proposed to carry out the shirring process with crimping fingers which are inclined relatively to the longitudinal axis of the sausage casing. In this proposed arrangement, the crimping fingers are grooved and are applied to the sausage casing along an interrupted portion of a helical line. (see German Pat. No. 1,632,137, as published).

A feature common to all these known methods and the corresponding apparatus is that, during the actual crimping process, i.e., when the sausage casing is moved against the backing means or against the force opposing its movement, the crimping element (finger or portion of a roller) must on the one hand be moved in the axial direction and on the other must be retracted in the radial direction from the shirring zone in order to provide space for succeeding shirred material. As a result of this movement in the radial direction, the crimping fingers slide and scrape over the sausage casing. In this way risk of damage to the sausage casing arises. Numerous efforts have been made to overcome these disadvantages (see, for example, U.S. Pat. No. 2,583,654 and particularly FIG. 9 and the associated text in column 11), but these efforts have not resulted in the complete removal of the main weakness of these crimping processes.

It is the object of the present invention to provide a stick of the above described type whose folds form a definite geometrical pattern so that the interior space and diameter of the stick are independent from the mandrel. Moreover, the stick according to the present invention should have great shirring ratio (ratio between the length of the unshirred sausage casing and the length of the shirred stick), a good resistance to bending, and a smooth, regular appearance.

This object is achieved by a stick of the above defined type which is characterized in that the secondary folds consist of an uninterrupted, uniform zigzag line with virtually no further secondary folds, that the peaks of the zigzag line have a substantially uniform distance from the helical line of the main fold, and that the individual sections of the zigzag line form sections of a screw line which winds in the opposite direction to the helical main fold.

The stick, which in the foregoing has been described with reference to the fold pattern which is easily discernible on the extending stick, may also be described in the shirred state. In the shirred state, the stick is characterized in that the secondary folds consist of a single uninterrupted secondary fold forming a regular, backwardly crossing zigzag line whose course within the double layer of casing material between superimposed sections of the windings of the helical main fold is defined by a combination of the following characteristics:

a. The peaks of the zigzag line are arranged between the windings of the main fold and the interior space of the stick.
  b. The peaks consist of a first series of peaks lying on the first layer of the double layer of casing material, and a second series of peaks lying on the second layer of the double layer of casing material, beneath said first layer.
  c. The peaks of each of the two series are spaced from each other on the circumference of the stick by about the same angle, relative to the axis of the stick, and the angle is the same for both series of peaks in one stick.
  d. From a first peak of the first series of peaks to a first peak of the second series of peaks, there extends a longer fold which contacts the interior space of the hollow cylinder, points to the interior space, and is curved, said first peak of the first series and said first peak of the second series being offset from another in the direction of the circumference of the hollow cylinder.
  e. From the first peak of the second series of peaks to the second peak (i.e. the one directly following the first peak) of the first series, there extends a shorter fold which does not contact the interior space of the hollow cylinder, points away from it, and is curved.
  f. Again, from this second peak of the first series of peaks to the second peak (directly following the first peak) of the second series of peaks, there extends a longer fold which may be defined as in (d), and this criss-crossing continuous sequence of zigzag folds is repeated over the entire stick in a helical pattern.
  g. The longer folds and the shorter folds substantially correspond to each other in length and shape.

It has been found that a stick of this structure confines a hollow cylinder whose interior space is independent from a mandrel. Further, it has been found that the diameter of the interior space of the stick may be varied, within certain limits, by adjusting the helical main fold to a larger or smaller pitch, while the casing itself remains unchanged. Thus, a possibility is provided for the first time to adjust the interior diameter by means of a parameter of the geometrical structure of the stick, which is easily adjustable during the shirring process, viz. the pitch of the main fold of the extended stick. This is a very important advantage of the stick according to the present invention.

Further, the stick according to the present invention has the advantage that due to the regularity of the secondary folds, the appearance of the stick is considerably improved, as regards its outer surface as well as its interior space. The stick looks very smooth and glossy, and the regularity of the fold arrangement is striking.

Instead of the above definition, which refers to the finished stick, the stick according to the present invention alternatively may be defined by the fold pattern of a stick that has been extended and opened out along a generatrix of the cylindrical casing. When it is extended and opened out along a generatrix of the cylinder jacket and smoothed out, the stick according to the present invention consists of a strip with parallel, straight edges. These edges correspond to the generatrix along which the casing has been opened out. Between these edges, parallel, oblique lines extend which correspond each to a full winding of the helical main fold. So far, the appearance of the fold pattern is very similar to that of known sticks. Between the parallel, oblique lines, however, the strip according to the present invention displays a regular, uninterrupted, exact line of folds consisting of essentially straight-lined, shorter and longer sections. The shorter sections of the zigzag line are formed by fold sections which point in the same direction as the helical main fold, as referred to the surface of the casing, whereas the longer fold sections of the zigzag line are formed by fold sections which point in the opposite direction. The peaks of the zigzag line have about the same distance from the oblique line of the main fold. With reference to the straight edges of the strip, the shorter sections of the zigzag fold are inclined in a direction opposite to that of the oblique lines of the main fold. Thus, when the oblique lines of the main fold extend from the lower left hand corner to the upper right hand corner, the shorter line extends from the lower right hand corner to the upper left hand corner. (The edges of the strip being vertical when viewed in this manner).

Besides the above described zigzag-shaped continuous regular secondary fold, the stick according to the present invention contains practically no further secondary folds. This particularly regular pattern of the secondary folds is the cause for the substantially circular-cylindrical shape of the interior space of the stick, which is formed automatically, without a mandrel, as also for the smooth exterior appearance of the stick, its high degree of resistance to bending, and the favorable ratio of shirring.

The present invention also provides a method of shirring cylindrical casings, particularly sausage casings, in which method the casing is moved in the direction of its longitudinal axis and shirred against a force opposing its movement, the force used for shirring being applied by at least one element which moves around the longitudinal axis of the casing. This method is extremely simple and reliable in operation, produces a shirred stick having an extremely uniform fold formation, avoids damage to the casing, can be applied to practically any diameter of casing, and can be carried out with apparatus of extremely simple construction.

In the preferred form of the method of the present invention, the element or elements used for shirring is or are constantly in positive engagement with the casing during the shirring process.

In this method, the force used for shirring is constant in amount, and the force vector rotates around the longitudinal axis of the casing. Thus, by this method the possibility of carrying out the shirring process in a truly continuous manner is created for the first time. Shirred sticks in which the formation of the folds is extremely uniform are produced, and they possess a straightness not hitherto obtainable without additional measures.

The force required for shirring is in relation to the longitudinal axis of the casing continuously applied at the same point revolving around the axis. In this way it becomes possible to create absolutely constant and definite operating conditions, while applying a minimal stress to the sausage casing. This has not been possible in the known methods using crimping fingers, particularly since the axially moved crimping fingers were also required to execute a radial movement or a pivoting movement during the crimping process, and that at precisely the time when the strongest force was being applied to the sausage casing.

The method of the present invention can be performed by moving the casing to be shirred over a mandrel and up to a backing means, the mandrel being used for blowing in gas, and air in particular, i.e., for inflating the casing. The mandrel, however, performs the additional important functions of carrying the shirred casing, keeping it straight, and defining its inside diameter. Removal of the casing from the mandrel gives rise to some danger of damage to the casing, especially when very thin casings are being processed. To avoid this disadvantage, the mandrels are usually slightly tapered in the known manner and have a very smooth surface. It also appears desirable to provide internal lubrication between the mandrel and the casing, preferebly using an oil for this purpose. The manufacture of mandrels having a very slight taper from the exact cylindrical form, and the other technical measures, are complicated and expensive.

A further subsidiary problem which can be solved by means of a preferred embodiment of the present invention is that of improving the method of the invention so as to eliminate the problems and disadvantages necessarily associated with the use of a shirring mandrel.

This is achieved when, in a method as above defined, the forward end of the casing is secured to a backing means to which the counter-force is applied, inflating gas is passed into the casing through the backing means and the casing being shirred is allowed to build up on the backing means to an extent such that the resulting shirred stick is unsupported except by a previously shirred portion of the stick. The stick is therefore not guided internally.

Surprisingly, it has been found that it is possible to carry out this method and also contain a shirred casing which has a sufficiently large internal diameter over substantially the whole length of the sausage casing. A process of this kind could not be carried out by any of the known techniques, since in all of them the formation of the folds constituted an uncontrolled random procedure, and constant conditions only prevailed during very short periods in the shirring operation. In the method of the present invention, however, shirring takes place by folding the casing in an absolutely uniform and mathematically precise manner, so that a constant internal diameter of shirred casing is obtained depending on the outside diameter of the initial casing, the pitch of the shirring helix found on the shirred casing after extending it again, the shirring contour and the pressure in the casing to be shirred. In the case of a frusto-conical shirring contour, the outside diameter Da and the inside diameter Di of the shirred casing, the pitch H of the helix on the extended shirred casing and the angle $\alpha$ between the frusto-conical surface and the axis of the casing are related, with good approximation, by the following formula:

$$Di = Da - H \times \sin \alpha.$$

According to the present invention, the above-stated result can be achieved by a further preferred method wherein the pitch H of the extended shirred casing is so selected that it is less than the pitch Ho of a corresponding shirred casing of which the inside diameter, determined by the outside diameter of the original unshirred casing and the shirring contour, is equal to the outside diameter of the mandrel.

The pitch H is the pitch of the helical fold in the extended shirred casing. With the increase in the inside diameter of the shirred casing which is surprisingly obtainable by reducing the pitch H in relation to the pitch Ho, removal of the sausage casing from the shirring mandrel is made easier. In particular it is possible to work with a cylindrical mandrel instead of a slightly tapered one. The risk of damage to the shirred casing is reduced and the entire apparatus for carrying out the method and in particular for removing the shirred casing from the mandrel can be greatly simplified.

It has also been found that the reduction of the pitch H to a value less than the pitch Ho as above defined, is not only achievable by using a shirring element having this pitch. Surprisingly, it has also been found that it is possible to operate with a shirring element or elements in which the means for forming the impression in the casing have a pitch $h$ which is greater than the pitch H required in the casing. In this preferred method, the said element or elements no longer simply slide in the recess impressed in the casing but also move along the casing transversely of this recess. Apart from the surprising result of being able to influence the inside diameter of the shirred casing in this way, the use of the method also leads to the element which makes the impression continuously overtaking the casing to some extent, as it rotates about the casing, and the casing is therefore stressed in a considerably more uniform manner than if the speed of advance of the casing were exactly the product of the pitch $h$ of the helical projection on the shirring element (= pitch Ho of the helical impression in the extended shirred casing) and the speed of revolution f of the shirring element. Thus, in this case, the relationship $v < h \times f$ applies.

In addition, this method offers the considerable advantage that, without the need for changing the shirring element, the inside diameter Di of the shirred casing can be controlled by simply adjusting the ratio of the speed of advance v and the speed of revolution f, by adjustment of the pitch $$H = \frac{v}{f}.$$

Inside diameters of the shirred casing that are too close to the outside diameter are of course precluded, firstly because of the resultant loss of strength in the shirred casing and secondly because of the reduced shirring ratio.

In the case of a frusto-conical contour (see the equation given above), it is preferred according to the invention to select a pitch H such that the resultant inside diameter Di is greater than the outside diameter d of the mandrel. It will be clear from this relationship that for this purpose it is necessary to select a pitch H which is shorter than the pitch Ho. Thus, the approximate formula for this pitch Ho is:

$$Ho = \frac{Da - d}{\sin \alpha}$$

The invention also provides an apparatus for carrying out the method of the invention, said apparatus including means for moving a casing in the direction of its longitudinal axis, means for applying a force opposing the movement of the casing during shirring and shirring means connected to an annular element adapted to be rotated about the longitudinal axis of the casing.

The annular element preferably takes the form of a sleeve and the sleeve has for shirring a helical projection on the cylindrical inner wall of the sleeve. The helical projection may be a correspondingly shaped element fitting in a groove in the inner wall of the sleeve. The helical element may be made of a material having good frictional properties. Very good results have been obtained when the sleeve and the helical projection are integral.

In a further form of the apparatus of the invention, the annular element is a unit consisting of a plurality of holders for rotatably mounted wheels, which wheels are successively so offset from one another that they are arranged on a helical path.

An apparatus that has proved advantageous has downstream of the said helical projection an additional element adapted to be rotated about the casing in synchronism with the said annular element, said additional element also being arranged to engage the casing to effect shirring. The additional element is preferably a rotatably mounted wheel, the axis of rotation of the wheel being inclined to the longitudinal axis of the casing at an angle equal to the angle of pitch of the helical projection, so that the wheel, in use, also rolls in and along the recess formed in the casing by the said projection.

In an apparatus for performing the above-described shirring operation in which the shirred stick is in part selfsupporting, the means for applying the force opposing the movement of the casing during shirring includes a backing means adapted to hold the forward end of the casing in a fluid-tight manner and having a passage through which inflating gas can be supplied to the interior of the casing, the backing means being dimensioned to provide support for a short part only of a shirred stick of a length normally intended to be produced with the apparatus.

The apparatus described offers the considerable advantage that the shirred casing can be removed in a particularly simple manner. The casing, after shirring, has only to be removed from a relatively short holding means. The previous complicated arrangements incorporating a slightly tapered mandrel are completely dispensed with. Furthermore, the distance in the direction of the axis of the casing through which the shirred stick needs to be withdrawn is considerably shortened. In addition, the risk of damage to the shirred stick is much reduced.

According to the present invention, in a further apparatus, with which the problems associated with a normal shirring mandrel can be avoided, a hollow mandrel is provided to support the casing and the shirred stick, and a means for advancing the casing towards the shirring means and a means for rotating the latter are so mutually adjustable that the internal diameter of a shirred stick is somewhat greater than the external diameter of the mandrel.

In the case of an apparatus in which a shirred stick having a frusto-conical contour is produced, this means that the means for advancing the casing and the means for rotating the shirring means are so adjusted that the ratio (v/f) is smaller than Ho, Ho being obtained from the above equation, so that the following relationship applies:

$$\frac{v}{f} < \frac{Da - d}{\sin \alpha}$$

wherein the symbols have the meanings stated above.

In a preferred apparatus in accordance with the invention the means for rotating the shirring means and the means for advancing the casing are connected by a mechanical gear which, particularly when the speed of advance v is constant, allows for adjusting the speed of revolution f of the shirring means, and which incorporates a motor for driving the means for rotating the shirring means and the means for advancing the casing.

The present invention will be more clearly understood from the following detailed description made by way of non-limiting example with reference to the accompanying drawings, in which.

Figure 1:
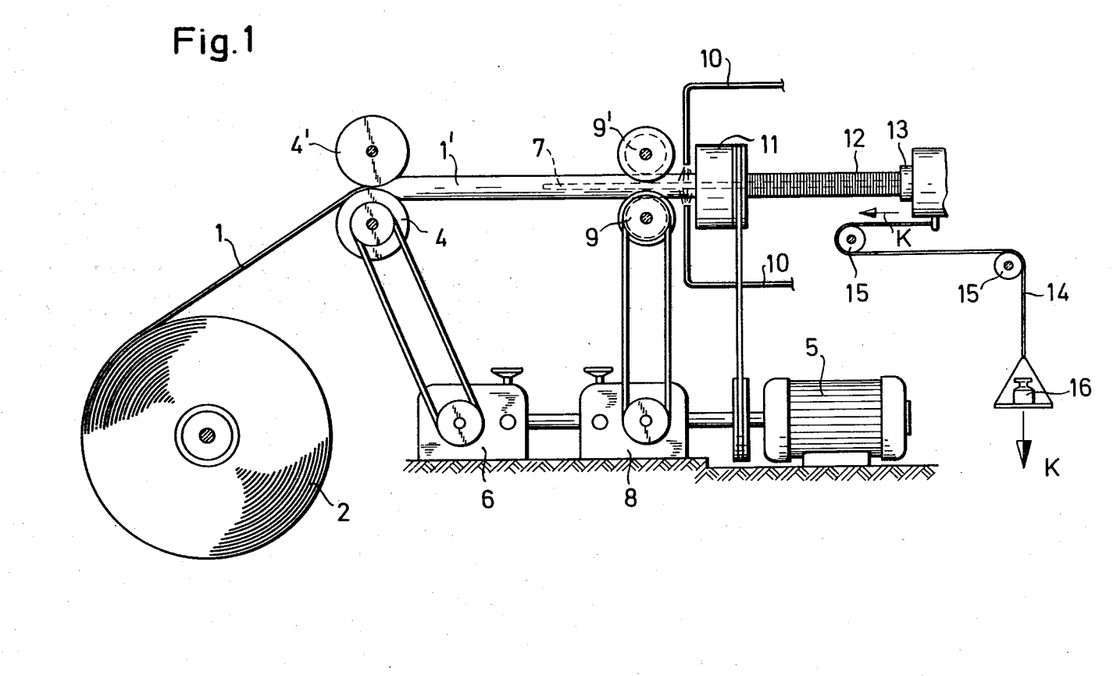
FIG. 1 is a diagrammatic side elevation of an apparatus for carrying out the method of the invention.

Referring to the drawings, in the apparatus illustrated in FIG. 1, a flattened sausage casing 1 is provided on a supply reel 2. Rollers 4 and 4' are driven by a motor 5 through a gear 6 and move the casing 1' over a mandrel 7 towards shirring and compressing means. Air is blown through the mandrel 7 in known manner in order to inflate the casing 1. The inflated casing 1' moves on towards a shirring unit 11 through two grooved rollers 9 and 9' driven by the motor 5 through a gear 8; the function of these rollers will be described in connection with FIG. 4. A lubricant can be applied to the casing 1' through nozzles 10. After the casing has passed through the unit 11, to be hereinafter described, it is compactly compressed. The shirring operation takes place with the casing being urged towards a movable backing means 13 which applies to the casing a constant counter-force in the direction opposite to that in which the casing is moved, this force being applied, for example, by a weight 16 suspended from a cord 14 passing over pulleys 15.

Figure 5:
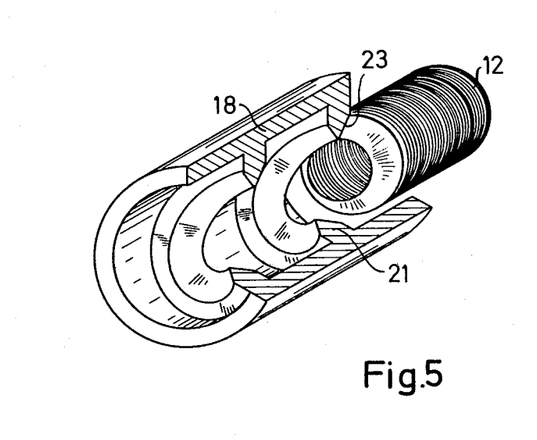
FIG. 5 is a perspective view showing a shirring element with part cut away.
Figure 6A:
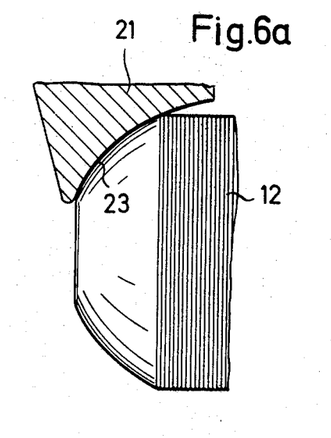
FIGS. 6a–6d show various elevations of shirred casings each with part of a shirring element in section shown in the shirring position.
Figure 6B:
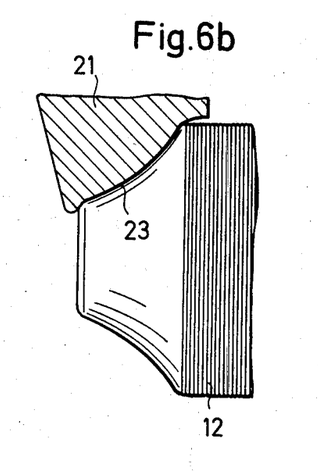
Figure 6C:
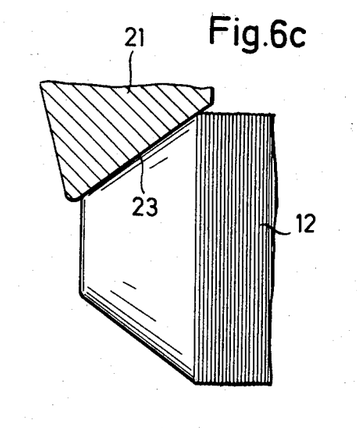
Figure 6D:
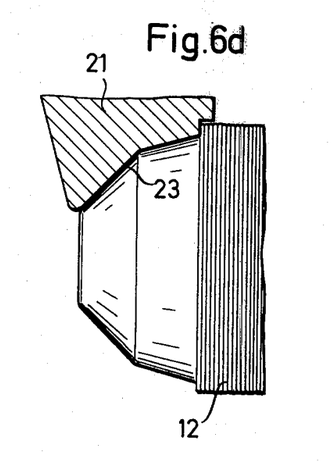

For a description of the actual shirring process, reference will now be made in FIG. 2. Inside a holder 17, a sleeve 18 is fixed to a V-belt pulley 19 and is rotatable on bearings 20. In its interior, the sleeve 18 has a helical inwardly extending projection 21, the configuration of which can be seen more clearly from FIG. 5. The V-belt pulley 19 is engaged by a drive belt 22 through which the sleeve 18 can be rotated.

Figure 2:
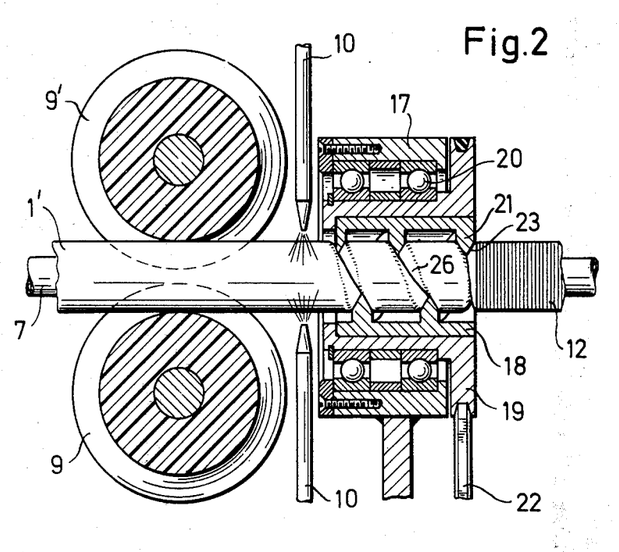
FIG. 2 is a similar view, partly in section, of part of the apparatus illustrated in FIG. 1, on a larger scale.

The inflated casing 1' moves into engagement with the helical projection 21 as illustrated in FIG. 2. The peripheral speed of the rollers 4 and 4' and of the grooved rollers 9 and 9' is preferably so adjusted that it provides the exact speed for advancing the casing 1', which speed results from the speed of rotation of the sleeve 18 with the projection 21, and the pitch of the helix along which the projection 21 extends.

While the greater part of the helical projection 21 deforms the inflated casing 1' to a certain extent, that end 23 of the projection 21 that faces towards the backing means effects the actual shirring and compressing operation. This end 23 (see FIG. 5) presses the sausage casing, acted upon by the remaining part of the helical projection, in a direction opposite to that of the counter-force K applied by the backing means 13, this end 23 passing around the axis of the casing 1' during the shirring operation and constantly engaging the casing. Instead of a single projection 21, a two-start or multi-start helical projection can be provided. In the case of a two-start projection, two shirring elements offset from each other are provided.

A shirred casing 12 is produced in a single-stage operation by the method described; the casing can be easily removed from the mandrel 7 and has high resistance to bending and is extremely straight. The shirring ratio was found to be greater than 80:1.

Figure 3:
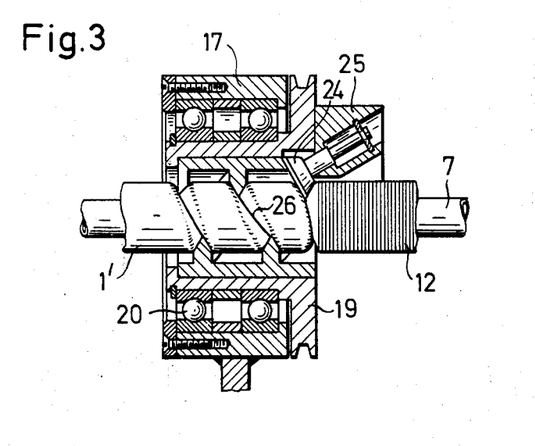
FIG. 3 is a similar view to FIG. 2 of part of a further embodiment.

A further form of the apparatus of the invention is illustrated in FIG. 3. This form differs from that illustrated in FIG. 2 in that, with it, the actual shirring and compression operation is no longer carried out by means of the end 23 of the helical projection 21 in the interior of the sleeve 18, but instead a small separate wheel 24 is provided for the purpose. A holder 25 for the wheel 24 is fixed to the driving pully 19 surrounding the casing 1'. The wheel 24 is so fitted that it engages in the recess in the casing 1' that has been formed by the helical projection 21. Together with the pulley 19, the wheel 24 runs around the casing and compacts the casing into a succession of close folds, in which operation it overcomes the counter-force K.

Figure 7A:
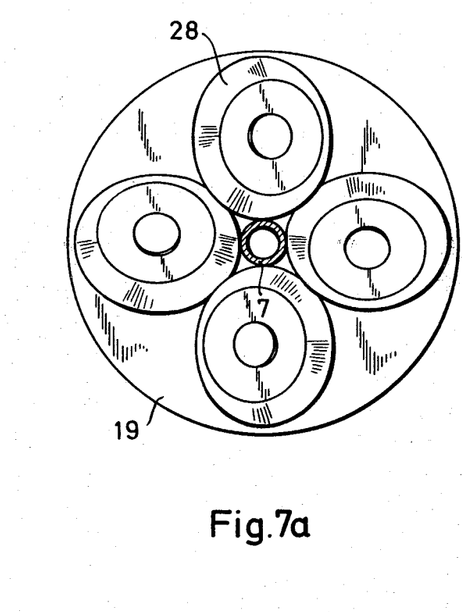
FIGS. 7a and 7b show, in end and side elevations respectively, two views of a further form of the shirring portion of the apparatus of the invention.
Figure 7B:
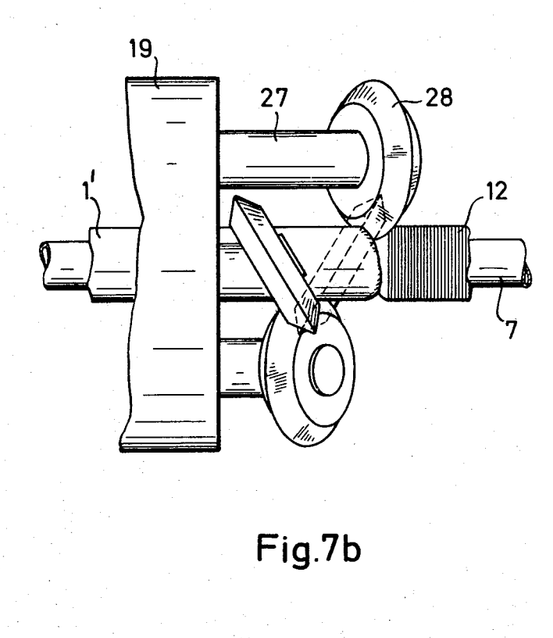

A further form of construction is illustrated in FIG. 7. In this form of the apparatus of the invention, there is no spiral projection 21 in the sleeve 18. Instead, four holders 27 each accommodating a small wheel 28, are mounted on the pulley 19 and are offset from each other by 90° with respect to the longitudinal axis of the casing 1'. The axial length of these holders 27 increases by the same amount from wheel to wheel, i.e. at each quarter revolution. In this arrangement, the axes of the wheels 28 are so inclined that the wheels, in operation, impress a helical recess in the inflated casing 1' and then run in this recess. The wheel 28 nearest to the backing means 13 carries out the actual shirring and compressing operation by applying successive folds of the casing against either the backing means 13 or the already shirred portion 12 of the casing. The use of wheels 28 of this kind instead of a spiral projection 21 (FIG. 2) offers the advantage of exposing the casing to only a very slight amount of frictional load. The speed of the operation can therefore be greatly increased, and the danger of damage to the casing is reduced. The wheels 28 can, if required, also be driven through a planet gear, for example.

The mathematical axes of rotation of the wheels 28 are so inclined that each of them, at the point of contact, is disposed perpendicular to the tangent to the helix which they describe on the casing 1'. The distance between the axis of rotation and the axis of the casing is equal to the sum of the radii of the casing and of wheel 28 minus the depth of the impression made in the casing 1' by a wheel 28.

Figure 4:
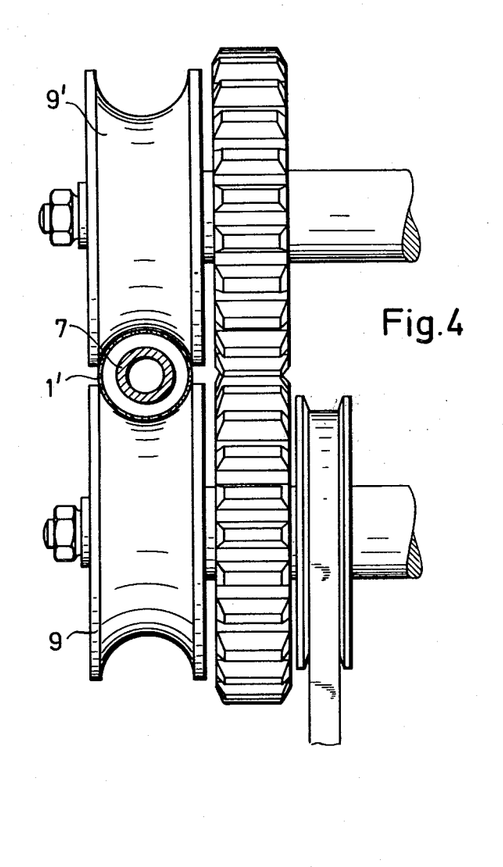
FIG. 4 is a part end elevation, part section of a detail of the apparatus on a further enlarged scale.

Reference will now be made to FIGS. 2 and 4, for the purpose of describing the function of the grooved rollers 9 and 9'. The projection 21 engaging the casing 1' and, to some extent also, the wheels 28, tend to turn the casing 1' in their direction of rotation as they move around the axis of the casing. This tendency is intended to be counteracted by the driven rollers 9 and 9'. The inflated casing 1' moves into the grooves in the rollers 9 and 9'. This method of driving completely precludes undesirable twisting of the casing 1'.

FIG. 6 illustrates various examples of forms of a compressed shirring contour obtainable by the method of the present invention. The particular purposes of these various forms is to impart high resistance to bending to the finished shirred casing and at the same time to obtain a good shirring ratio.

Apart from providing a solution to the initially stated problem, the method and apparatus of the present invention enable the following advantages to be obtained. The possibility is offered of producing a finished shirred casing 12, e.g. a compressed sausage casing having a shirring ratio of 80:1 and above, in a single operation, i.e. without the need for a subsequent compressing stage. This operation can also be carried out in a manner causing no damage to the casing, and it results in a shirred casing which is completely free from defects despite the small wallthickness of the casing, the products having a fold formation of a uniformity hitherto not known and possessing high resistance to bending.

The apparatus is extremely simple in construction and reliable in operation. One and the same apparatus can be designed for dealing with different diameters of casing, and the machine can be changed over for handling various diameters by simple manual means or even automatically. The method of the present invention can be operated more rapidly and economically than any of the known methods.

Figure 8:
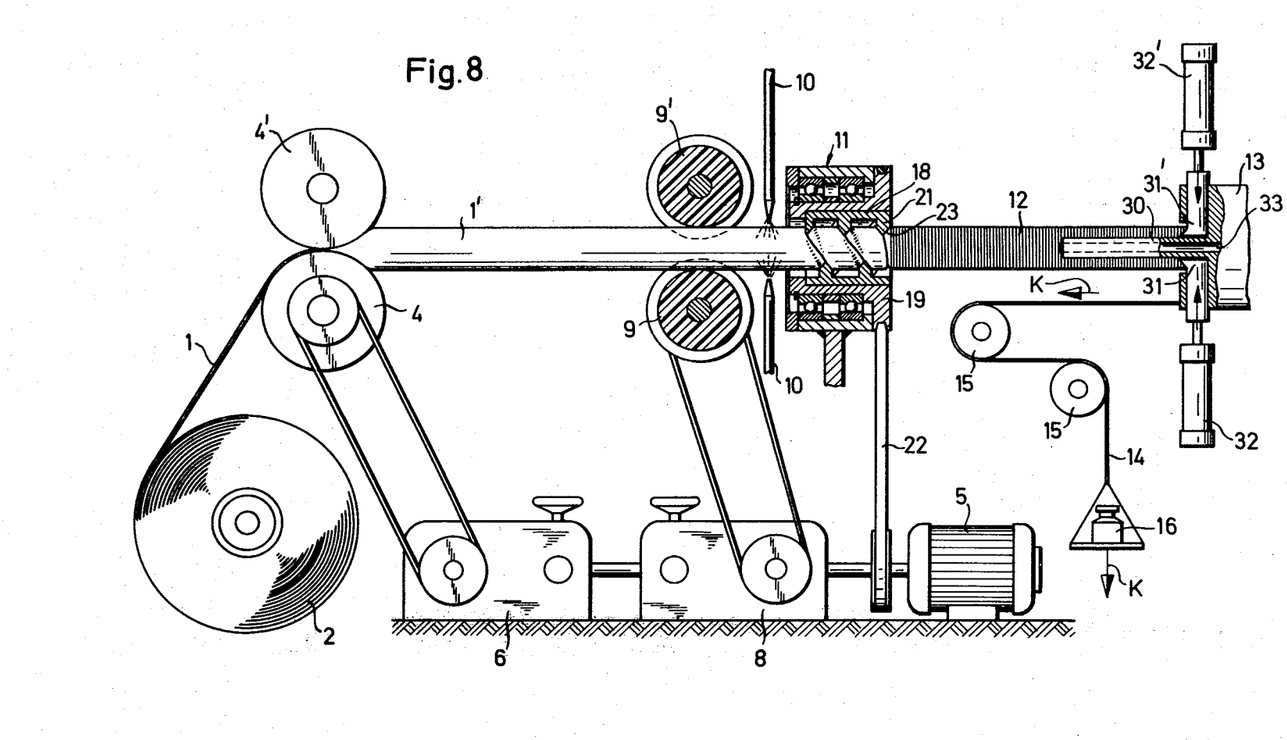
FIG. 8 is a diagrammatic side elevation of a further apparatus for carrying out the method of the invention.

The apparatus illustrated diagrammatically in FIG. 8 is substantially the same as that shown in FIG. 1. It does, however, differ therefrom in that at the commencement of the shirring operation, the beginning of the casing 1 is drawn on to a short tubular element 30 which projects from the backing means 13, and at this point the casing is gripped by two jaws 31 and 31' actuated by two compressed air cylinders 32 and 32' respectively. Compressed air is fed through an opening 33 into the interior of the casing 1 so that the latter is inflated over its length beginning at the point where the casing is in contact with the rollers 4 and 4'. The actual shirring process takes place, in the manner previously described, in the shirring unit 11.

It has thus been found that when shirring by this method, a mandrel can be dispensed with completely. In the method described, a shirred casing 12 is formed that is so uniform and precise in shape and straightness that even in the case of fairly long lengths of shirred casing, the shirring operation can be carried out by pressing the casing against self-supporting already shirred material 12. The short tubular element 30 is here used simply to anchor the casing. In this way a casing has been shirred to produce a stick that was 25 cm in length and had a shirring ratio of 80 and above, no subsequent compressing operation having been required. The self-supporting shirred length 12 of the casing had a very uniform circular interior and there were no isolated, inwardly projecting folds, so that a stuffing horn for filling the casing with sausage meat could be introduced without difficulty. In the example described, the inflated casing 1' had a diameter of approximately 18 mm. The inside diameter of the shirred casing was a little above 11.2 mm. The shirring element used had a pitch of 12 mm. The finished shirred casing can be removed from the backing means in an extremely simple manner. The casing has only to be pushed off the tube 30, with the aid of the jaws 31 and 31' for example, the casing being located quite loosely on the tube. Thus, it is not necessary to use the previous procedure, complicated as regards equipment and technique, for pushing the finished shirred casing 12 off a slightly tapered mandrel as illustrated in FIG. 1 and designated by the numeral 7.

Figure 9:
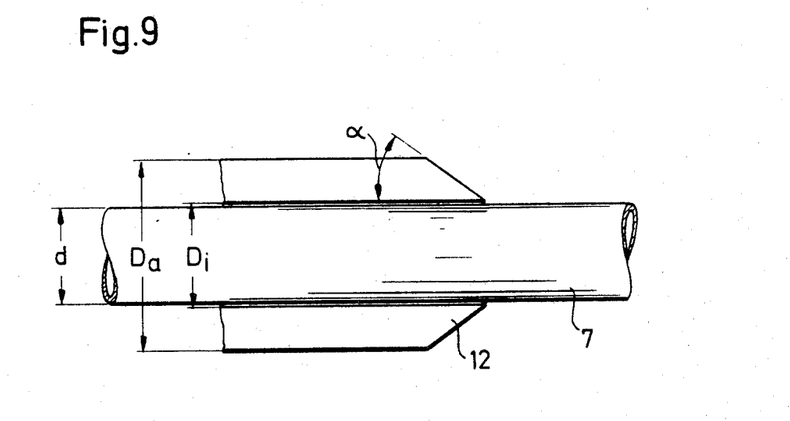
FIG. 9 is an illustration of the geometry of a shirred casing, where the latter has a conical shirring contour.

FIG. 9 shows the geometry of a shirred casing having a frusto-conical shirring contour and produced by the method of the present invention. The following relationship exists between the various geometerical values:

$$Di = Da - H \cdot \sin \alpha$$

herein:
Di is the inside diameter of the shirred casing,
Da the outside diameter of said casing,
H the pitch of the helical fold in the shirred casing when again extended, and
$\alpha$ the angle formed between the generatrix of the frusto-conical portion and the axis of rotation. This relationship is not quite exact, but provides a good approximation.

The important feature of the method of the invention by which a shirred casing is produced having an inside diameter greater than the outside diameter of the mandrel will now be explained by reference to FIGS. 9 and 10. The above-described method was carried out using seamless spun "Cellophane" (Regd. Trade Mark) casing material having a width of 27 mm when flat. A cylindrical mandrel having an outside diameter of 12 mm was used. The pitch h of the helical shirring element 21 was 20 mm. The angle of inclination of the frusto-conical portion (see FIG. 9) was approximately 30° to 40°.

First the shirring operation was carried out with the sausage casing being advanced at a speed $v$ and the shirring element being rotated at a speed $f$, these speeds giving the relationship.

$$v = h \times f.$$

The shirred casing so formed was firmly located on the mandrel and could only be removed therefrom by the use of considerable force. The pitch H (see in particular FIG. 10) was likewise 20 mm in this case.

The shirring operation was then carried out using the same material and the same mandrel. This time however, the speed of rotation $f$ was changed so that the pitch H was 12 mm, the relationship $v = H \times f$ also applying in this case. Thus, the relationship with the pitch h of the shirring element was $$v < h \times f.$$

The shirred casing obtained in this instance had an inside diameter Di of 12.2 mm. The casing could be easily pushed off the mandrel.

Figure 10:
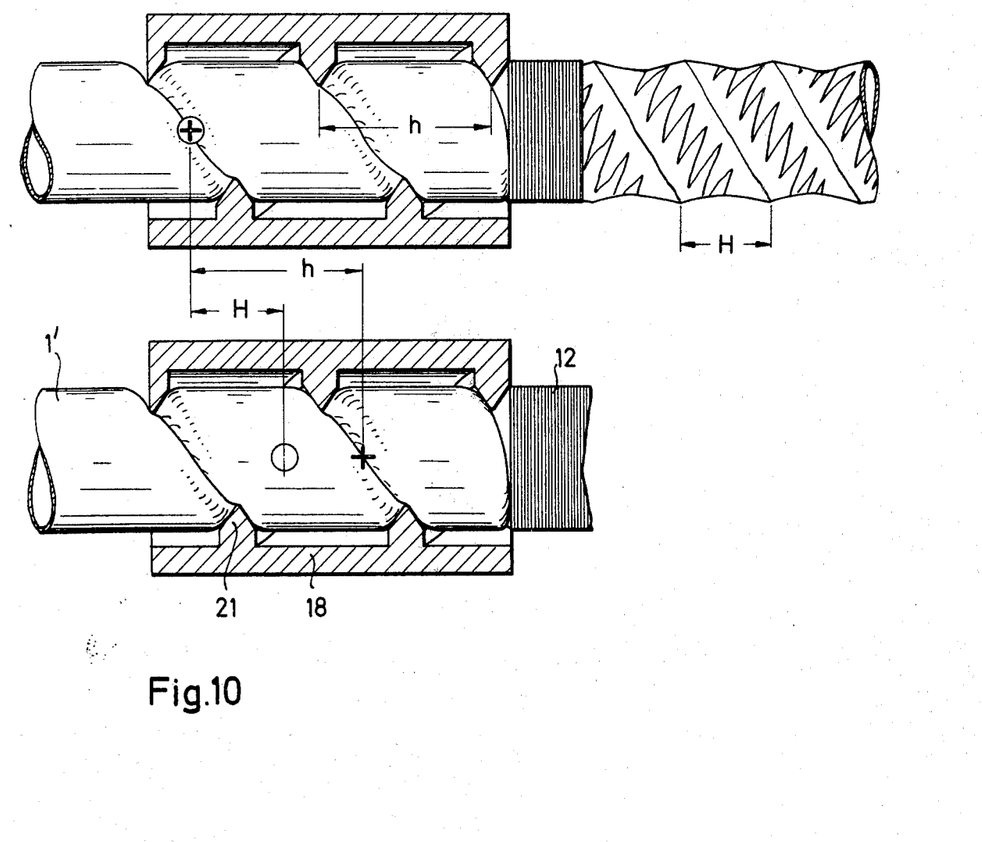
FIG. 10 is a diagrammatic sectional illustration of a shirring element at two different stages of the shirring process.

Reference will now be made to FIG. 10 for the purpose of further explaining this method of shirring called the "overtaking" method. The two successive positions differ by one revolution of the shirring element. In the upper chronologically first position a point, marked with a cross, on the helical element 21 might be in engagement with a point, marked with a circle, on the casing 1' to be shirred. After one revolution of the sleeve 18 the corresponding point, marked with a cross, on the helical element 21 that is now positioned at a place one complete turn further on in the direction of movement of the casing and is likewise marked with a cross, is no longer in engagement with the point on the casing 1' marked with a circle. It can be seen from this that the helical element 21 is no longer simply "cutting a screw-thread" in the recess in the casing 1' (the speed of revolution of the sleeve and the speed of advance of the casing no longer quite conform to the first-mentioned relationship $v = h \times f$), but that the helical element 21 is also overtaking the casing. With this mode of operation, it has been found that the inside diameter of the shirred casing that is formed becomes greater than when the operation is carried out in accordance with the relationship $v = h \times f$. Thus, it has become possible for the first time to operate with a cylindrical mandrel and yet to achieve easy stripping of shirred casings having a length of 38 cm. Thus both the hitherto considerable risk of damage to the shirred casing and the need for a tapered mandrel are eliminated.

The stick according to the present invention is distinguished by a particular fold pattern which will be illustrated in the following by reference to FIGS. 11 to 15.

Figure 11:
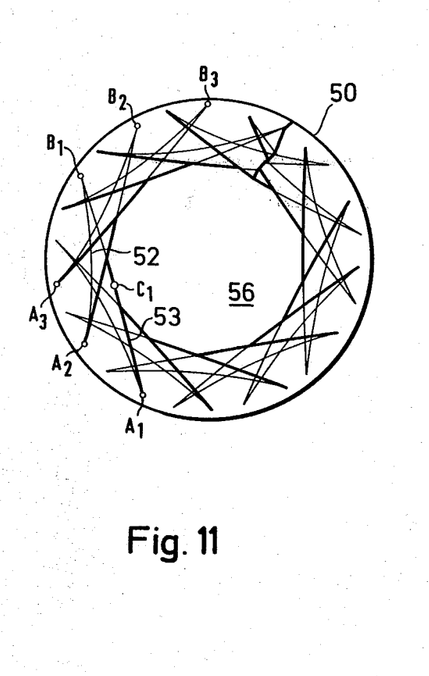
FIG. 11 is a front elevation of the stick according to the present invention.
Figure 12:
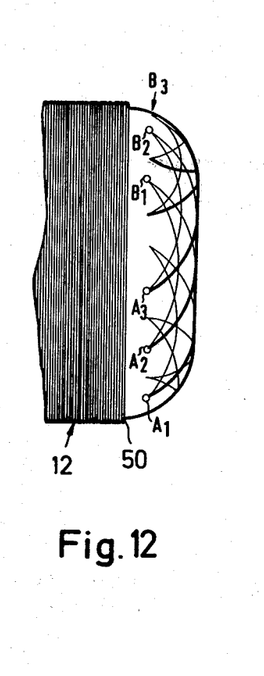
FIG. 12 is a side elevation of the stick according to the present invention.
Figure 13:
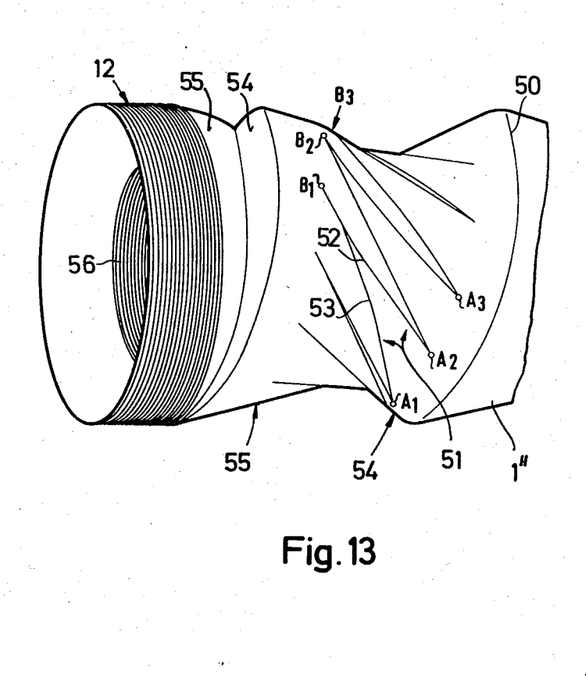
FIG. 13 is a perspective view of the stick, with part of the stick being extended.

FIG. 13 shows a section of the stick 12 according to the present invention with a portion at one end of the stick 12 extended. FIG. 12 is a representation of the end of the stick 12, showing its profile and the secondary folds, and FIG. 11 shows a corresponding view, seen in axial direction. In the unextended state of the stick, the helical main fold 50 is wound upon itself in close windings and determines the outer surface of the stick. The casing material between the windings of the main fold is distributed towards the interior space of the stick in a special manner. The material must be folded in secondary folds, because the same length of material distributed over the outer circumference of the stick must also be distributed over its interior surface.

The secondary folds, which in the case of the known sticks have been irregular, random creases, form a single, uninterrupted, secondary fold 51 in the stick according to the present invention. In this secondary fold 51, shorter fold sections 52 alternate with longer fold sections 53. These fold sections extend between the peaks A and B of the zigzag line. Each of the fold sections 52 and 53 connects a point of the series of peaks A with a point of the series of peaks B. The peaks A of the first series are lying on the first layer 54 and the peaks B of the second series are lying on the second layer 55 of the casing, which between two windings of the helical main fold 50 is substantially arranged in two superimposed layers.

Figures 14A, 14B, 14C:
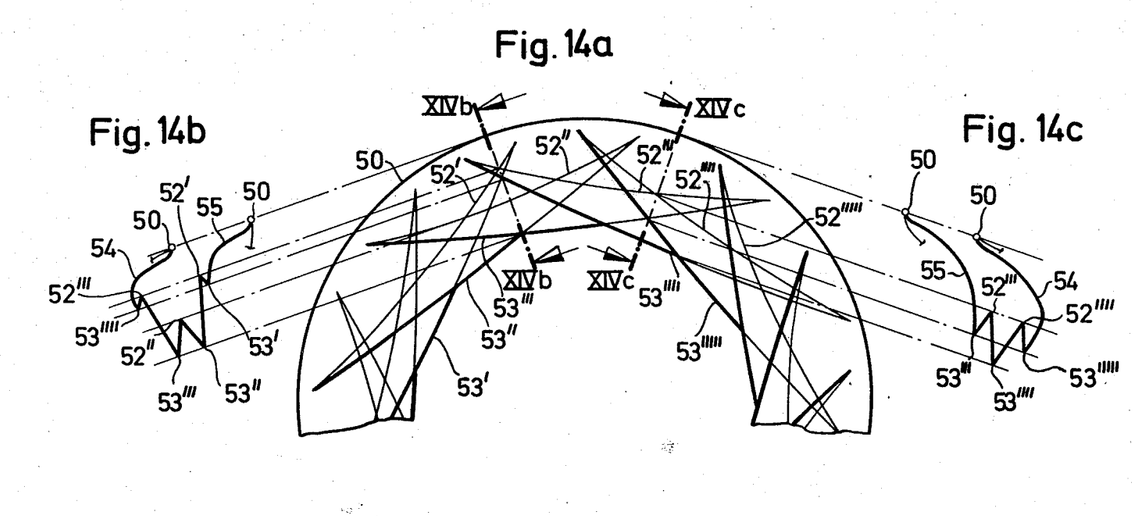
FIG. 14a is a detail of FIG. 11, with two sectional views, 14b and 14c.

The longer fold section 53 extends from a first peak A1 of the first series to a first peak B1 of the second series offset from it on the circumference of the casing. This fold contacts the interior space 56 of the stick 12 in point C1 (see FIG. 11). Point C1 is approximately in the center of the longer fold 53 extending from A1 to B1. From the first point B1 of the second series of peaks, there extends a shorter fold 52 to the second point A2 of the first series of peaks, which is directly adjacent point A1. Contrary to the longer folds 53, the shorter fold 52 does not point to the interior of the casing, but projects outwardly (see FIG. 14). The shorter fold 52 does not contact the interior of the casing. When seen from the interior of the casing, however, the curvature of both folds, i.e. the longer fold 53 and the shorter fold 52, is convex.

FIG. 14 shows a section of the view shown in FIG. 11. Further FIG. 14 shows two diagrammatic sectional views of the stick, one of them in a partially extended state, to demonstrate more clearly the position and direction of the secondary folds. The lines of the main fold 50 and of the secondary folds 52 and 53 appear as points in the sectional views. The sectional views show how the different sections of the secondary fold cross each other.

Figure 15:
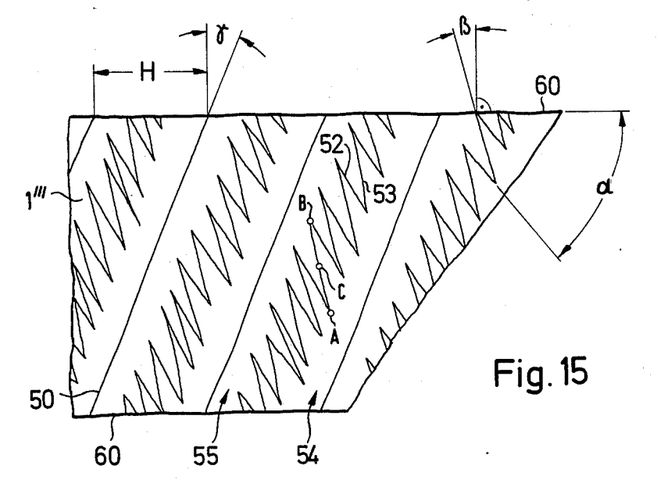
FIG. 15 shows the fold pattern of an extended and opened-out shirred casing.
Figure 16:
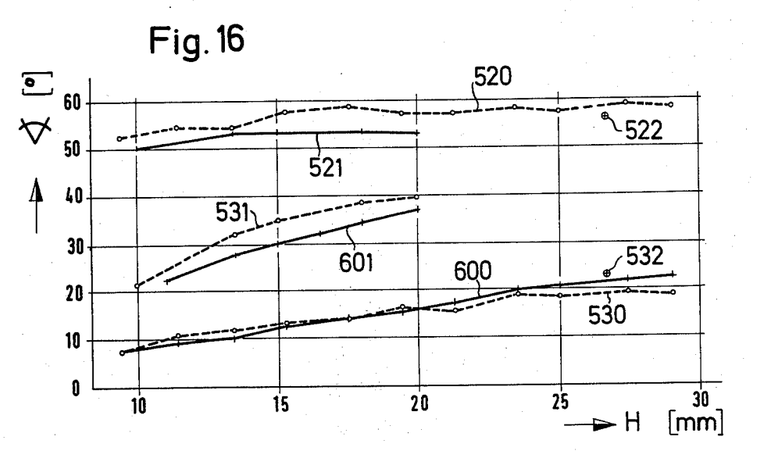
FIG. 16 is a graph.

A number of different sticks were produced by the above described process and their folds were examined. It was found that, at least in the casings of the sizes examined, a number of regularities existed. FIG. 15 shows the fold pattern of a stick according to the present invention which becomes apparent when the stick is extended again and the casing is opened along a generatrix of the cylinder and spread out. The shorter fold sections 52 of the zigzag-shaped secondary fold form an angle $\alpha$ with the edge 60 of the strip 1''', and the longer fold sections 53 of the zigzag-shaped secondary fold form an angle $\beta$ with the normal to the edge 60. It has been found that in the case of a conventional regenerated cellulose sausage casing of 26 mm diameter, the shorter folds 52 of the zigzagged secondary fold always form an angle between 50° and 60° to the edge 60 of the opened casing 1''' or to the axis of the casing or stick; (see sequence of points 520 in FIG. 16). It turned out that this angle is independent from the pitch H of the main fold 50. The same observation was made with sticks produced from a casing of 18 mm diameter (see points 521 in FIG. 16) and with a stick produced from a casing of a diameter of 40 mm (see points 522 in FIG. 16).

On the other hand, the angle $\beta$ formed between the longer fold 53 of the zigzagging secondary fold and the axis of the casing was obviously determined by the pitch H of the helical main fold 50. This angle $\beta$ changed about linearly with the pitch from about 9° at a pitch H of 10 mm to a value of about 21° at a pitch of 29 mm. This approximately linear relation (see points 530 in FIG. 16) was observed in a stick which had been produced from a casing having a diameter of 26 mm. The material used was conventional regenerated cellulose. In a stick produced from a casing of 18 mm diameter, the angle $\beta$ was found to change from 21° at a pitch H of 10 mm to about 40° at a pitch H of 20 mm (see points 531 in FIG. 16). In this case, too, the change was approximately linear to the change of the pitch H.

It is striking that in both cases the relation between the angle $\beta$ and the pitch H and the relation between the angle of inclination $\gamma$ of the helical main fold 50 and the pitch H (which is likewise shown in FIG. 8) is substantially the same; (see points 600 and 601 in FIG. 16).

Due to the regular pattern of secondary folds in the stick according to the present invention, it is possible to control the formation of the interior space within certain limits, by means of different pitches H, but independently from the mandrel used. It has been found in particular, that by means of the regular fold pattern a stick may be produced whose interior space is such that the stick is only loosely positioned on the mandrel 7 and can be easily displaced. This is in striking contradistinction from the known sticks which invariably adhered very firmly to the mandrel and whose interior space was formed by the mandrel alone, because the secondary folds were distributed in random order between the windings of the helical main folds.

What is claimed is:

1. A stick consisting of a circular-cylindrical casing that has been shirred to form a hollow cylinder, and displaying an outwardly projecting helical main fold and further displaying, in the extended and flattened state, secondary fold lines lying between the windings of the helical line of the main fold, said lines of the secondary fold consisting of a continuous, uninterrupted, uniform zigzag line which is substantially without further secondary folds, that the peaks of this zigzag line have a substantially constant distance from the helical line of the main fold, and that the individual sections of this zigzag line are helical sections which wind in the opposite sense to the helical main fold.

2. The stick according to claim 1 displaying secondary folds arranged between the windings of the main fold and the interior space of the hollow cylinder, with the casing material disposed between the interior space and the main fold being superimposed substantially in the form of a circular frustum, said secondary folds consisting of a single, continuous uninterrupted secondary fold which has a regular, backwardly crossing zigzag form and whose path within the double layer of casing material between superposed sections of the windings of the helical main fold is defined by a combination of the following characteristic features:

a. the peaks of the zigzag line are arranged between the windings of the main fold and the interior space of the stick;
b. the peaks consist of a first series of peaks lying upon a first layer of the double layer of casing material, and a second series of peaks lying upon the second layer of the double layer of casing material beneath said first layer;
c. the peaks of the two series are offset along the circumference of the cylinder by about the same angle, referred to the axis of the stick, said angle being the same for both series of the same stick;
d. from a first peak of the first series of peaks to the first peak of the second series of peaks, there extends a longer fold which contacts the interior space of the hollow cylinder in a point, points to said interior space, and is curved, said first peak and said other first peak being offset from each other in the direction of the circumference of the hollow cylinder;
e. from the first peak of the second series of peaks to a second peak of the first series of peaks which is directly adjacent to the first peak, there extends a shorter fold which does not contact the interior space of the hollow cylinder, points away from said interior space, and is curved;
f. from the second peak of the first series of peaks to a second peak of the second series of peaks which is directly adjacent to the first peak of said second series there extends again a longer fold which may be defined as in (d), and this pattern of crisscrossing continuous zigzag folds continues in a helical line over the whole stick; and
g. the longer and the shorter folds substantially correspond in length and shape within each group.

3. The stick according to claim 2, in which the casing consists of regenerated cellulose.

4. The stick according to claim 3, in which the zigzag-shaped secondary fold is arranged within the stick in a manner such that when the stick is extended and opened out along a generatrix of the cylinder, the shorter fold forms an angle $\alpha$ of between about 50° and 60° with the cutting line, and the longer fold forms an angle $\beta$ with the normal to the cutting line which about corresponds to the angle $\gamma$ between the helical main fold and the normal to the cutting line, but is inclined in the opposite direction.

* * * * *

UNITED STATES PATENT OFFICE
CERTIFICATE OF CORRECTION

PATENT NO. : 3,907,003
DATED : September 23, 1975
INVENTOR(S) : Richard REGNER et al It is certified that error appears in the above—identified patent and that said Letters Patent are hereby corrected as shown below:

[73] Assignee:  Cancel "Kalle" and insert -- Hoechst --.

Signed and Sealed this fourth Day of May 1976

[SEAL]

Attest:

RUTH C. MASON
Attesting Officer

C. MARSHALL DANN
Commissioner of Patents and Trademarks